May 2, 1933.  R. E. DOWD ET AL  1,907,098
AEROPLANE PASSENGER'S SAFETY BELT
Filed Jan. 14, 1930
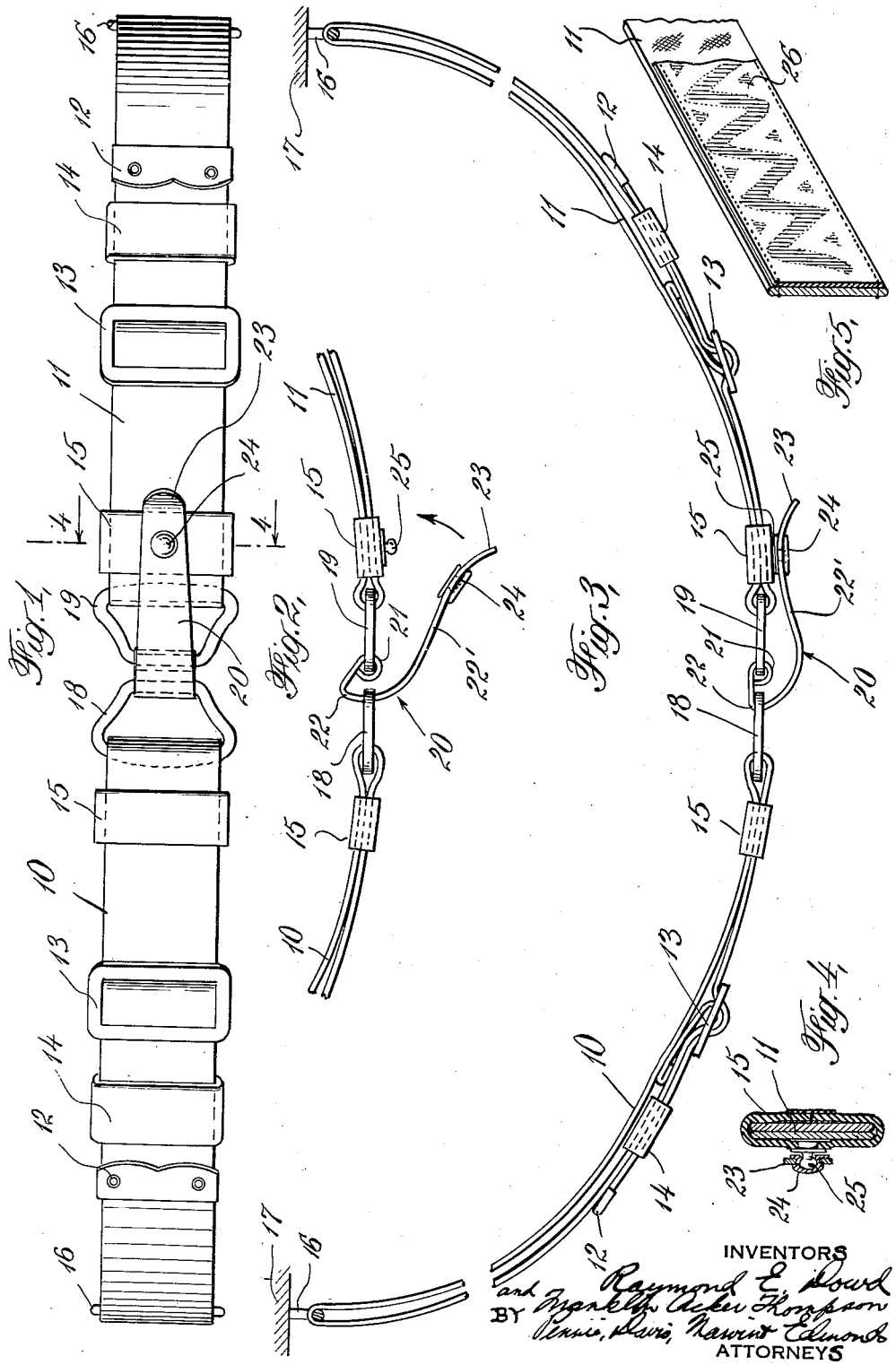
INVENTORS
Raymond E. Dowd
and Franklin Acker Thompson
BY Pennie, Davis, Marvin Edmonds
ATTORNEYS Patented May 2, 1933

1,907,098

UNITED STATES PATENT OFFICE

RAYMOND E. DOWD, OF STATEN ISLAND, NEW YORK, AND FRANKLIN ACKER THOMPSON, OF RIDGEWOOD, NEW JERSEY, ASSIGNORS TO THE RUSSELL MANUFACTURING COMPANY, OF MIDDLETOWN, CONNECTICUT, A CORPORATION OF CONNECTICUT

AEROPLANE PASSENGER'S SAFETY BELT

Application filed January 14, 1930. Serial No. 420,806.

This invention relates to safety belts, and has particular reference to safety belts for securing the passengers of aircraft in their seats in order to prevent injury to them during sudden movements of the craft.

Aeroplane passengers' safety belts as heretofore provided, consisted of a pair of flexible straps or webs anchored at one end to the floor or seat and having a quick-release buckle for securing together the opposite ends of the straps or webs after they have been folded over the lap of the passenger. The quick-release buckle usually comprises a cam-shaped lever tongue secured to one end of the belt and adapted to be inserted through a ring or loop secured to the other end of the belt. When this lever tongue is folded over after being inserted through the ring or loop it is normally locked in place by reason of the cam shape thereof, which causes the ring to lodge and remain in the hook of the cam. The buckle is released by moving the lever tongue backward so that the ring slips out of the hook of the cam and the tongue is released.

This type of quick-release buckle will remain latched or closed only when the belt is held fairly tautly or when it lies flat. At other times it will, because of its construction, work loose because of slackness in the belt, vibration, twisting of the belt, and the like. Since the buckle does not always lie flat or taut when in use, and as it is subject to vibration of the craft and movements of the passenger, it tends to work loose and frequently the buckle becomes unlatched and the desired safety function of the belt is lost, resulting in liability of injury to the passenger who depends upon the belt for his safety while seated in the craft.

As a typical instance, assume that the belt has been adjusted to fit a large passenger, who has vacated the seat, and a smaller passenger has taken his place. Usually the passenger or the attendant fails to readjust the belt to fit the smaller passenger because of neglect or because it is difficult or impossible to adjust the length of the belt. The buckle accordingly falls forward into the lap of the passenger and hangs so loosely that the ring is dislodged from the hook of the lever tongue and slides out over the cam surface of the tongue lever, or subsequent strain on the belt, however slight, causes the cam of the lever tongue to move the same out of the ring in accordance with its function under the circumstances, and consequently the belt is released, usually without the knowledge of the passenger. Thus, when the passenger has need for the belt upon which he is relying, the belt is ineffective for the purpose intended. This is especially objectionable because the passenger would naturally exercise more care if the belt upon which he would rely were not present, and a greater danger is thus entailed.

It is the principal object of this invention to provide an aeroplane passenger's safety belt which is fitted with a quick release buckle of such a character that it can only be released when the passenger intends to do so, and no accidental release is possible, whereby the aforementioned objections to present forms of aeroplane safety belts are obviated. More particularly, a quick release belt is provided in which the buckle is locked or held positively in the closed position against accidental release by separable means which in no way hinders the quick-releasing action of the belt when it is desired to free the passenger. In short, positive releasing action on the part of the passenger or another is required before the belt can be released.

Another object of this invention is to provide a safety belt of flexible material such as webbing, which is so arranged that adjustment of the belt to change its length is facilitated and made easy even to an unskilled passenger, and, to accommodate this adjustment with its consequent slippage of the belt strap or web, that part of the separable buckle-locking means which is adapted to be mounted upon the strap or web is placed on an adjustable carrier mounted upon the strap or web of the belt.

A further object of this invention is to provide a safety belt of uniform strength throughout its length and at the same time to provide a belt whose exposed portion is decorative without the necessity of weakening the belt to introduce decorative material or piecing the belt for this purpose.

These and other objects of this invention are obtained in a preferred embodiment thereof in which two plain straps or webs of woven webbing or other suitable material are fitted with an adjustment buckle at each end by means of which the straps or webs may be arranged in loops whose length is readily adjustable without requiring any additional securing or making operation. One end of each of the two loops is passed through a cleat or the like mounted on the floor of the aircraft at either side of the seat or otherwise connected to the seat or the like.

Of the other ends of the two loops, one is fitted with a slidable ring and the other is fitted with a slidable lever tongue. This lever tongue is in the form of an elongated hook, the hook end being connected to the strap and being adapted to receive and hold the ring, and the other end of the tongue is extended in the form of a cam-shaped lever, which serves as a handle for releasing the ring from the hook of the tongue when it is desired to release the belt. The shape of this lever tongue provides the quick-acting release feature of the belt.

The handle end of the lever tongue is fitted with one part of a separable snap fastener or the like, and the other part of the fastener is mounted upon a loop or other carrier slidable or otherwise adjustable upon the belt in order to accommodate the length adjustment of the belt. The two parts of the snap fastener cooperate to hold the end or handle of the quick-release lever tongue down, but do not restrain or prevent the opening of the buckle when desired. Other equivalent or alternative holding means may be used with facility, but the snap fastener has been found to be most effective and is preferred.

The upper surface of the strap or web of the belt is provided with decorative applique which is sewn in place without weakening the belt in any way nor interfering with its proper function. Any suitable decorative material may be used and it is preferred that it be placed upon that part of the belt which lies over the lap of the passenger, i. e., at either side of the quick-release buckle.

For a better understanding of this invention, reference is made to the accompanying drawing, in which Figure 1 is a front view of the novel safety belt of this invention;

Fig. 2 is a fragmentary edge view of the same, showing the buckle in opening position;

Fig. 3 is an edge view of the complete belt and mounting thereof, showing the buckle in closed position;

Fig. 4 is a cross-section taken along the line 4—4 of Fig. 1; and

Fig. 5 is a perspective view of a portion of the belt showing the decorative applique.

In the drawing, numerals 10 and 11 jointly designate the two parts or straps or webs of the belt, and each of these parts is made of flexible material such as leather, but it is preferred that woven webbing be employed, since this material is cheaper, stronger, more flexible, more uniform in strength, and has a longer life without being subject to the common causes of deterioration of leather. These straps 10 and 11 are formed in one piece lengths having a ferrule 12 at one end, and an adjustment buckle 13 at the other end. Thus, the straps 10 and 11 may be initially made in their final form, so that no sewing or other attaching or making operations are necessary when the strap is installed. Mounted on these straps are the loops 14 and 15, the former being employed for holding down the loose end of the strap as shown particularly in Fig. 3, and the latter being employed to hold the two portions of the strap when it is looped as illustrated in Fig. 3.

As shown in Figs. 1 and 3, the straps 10 and 11 are formed into loops by passing the free ends thereof through the adjustment buckles 13 and through the loops 14. It will be seen that merely by loosening the straps 10 and 11 in their adjustment buckles 13 and pulling on the free ends of the straps, the lengths of the loops may be varied to suit conditions. One end of each of the loops formed by straps 10 and 11 is passed around the cleat 16, which is secured to the floor 17 adjacent the passenger's seat, to the passenger's seat, or any other anchorage.

The other end of strap 10 is looped through the ring 18, which is preferably stamped of sheet metal or the like in one piece, and made strong enough to withstand a considerable strain. The loop 15 of strap 10 is then pushed along strap 10 to a position adjacent the ring 18 so as to hold this ring in position at the end of the loop of strap 10 as shown in Figs. 1, 2 and 3. Similarly, a ring 19 is mounted on the free end of strap 11, and the loop 15 is pushed along the strap 11 to a point adjacent the ring 19 so as to hold the latter in position at the free end of the loop of strap 11.

Journalled on ring 19 for free movement thereon, is the tongue 20 of the buckle. This tongue 20 is rigid and is formed of sheet metal with an eye 21 at one end, which is journalled upon ring 19, the hook 22 in which the ring 18 is adapted to lodge, and a cam shaped lever 22; the end of which 23 is extended and turned upwardly so as to form a handle, which may be conveniently grasped by the passenger for releasing the belt quickly. The operation of this tongue lever may be explained in connection with Figs. 1 and 3. In order to use the belt, the passenger inserts the handle end 23 of tongue lever 22' through ring 18 and moves the handle 23 through an arc, indicated by the arrow in Fig. 2, into the position shown in Figs. 1 and 3. It will be seen that the ring 18 is lodged in the hook 22, and that the tongue 20 will remain in this latched or locked position so long as it lies flat against the belt as a whole in the manner illustrated in Fig. 3. If, however, the handle 23 is moved outwardly, either intentionally or accidentally, the ring 18 slips along the cam surface of 22', and inasmuch as this surface is shaped so that any pull upon ring 18 or handle 23 causes the tongue 20 to turn when it is not in closed position, the tongue as a whole is released from ring 18, and the belt as a whole is also released, and becomes ineffective as a belt.

When the belt hangs loosely, that is, when no appreciable tension is applied to the belt, the nature and shape of the tongue 20 are such that it will release itself, and frequently the passenger does not know that the belt has become released and that no reliance can be placed upon it for safety. This also happens when the belt hangs loosely so as to permit the belt to kink and fall apart in the manner described. In order to prevent this accidental and unintended release of the belt, means is provided for holding the belt in closed position, this means in no way preventing the intended release of the belt, but merely holding the buckle in closed position against the liability of any accidental release as described above.

In a preferred arrangement, this holding means for the buckle comprises a snap fastener of a conventional type, although any equivalent fastening or holding means may be employed which will perform the intended function. In this preferred arrangement, one part of the separable snap fastener, which may be the female part 24, is mounted upon the handle end 23 of the tongue 20, and may be conveniently mounted by drilling a hole in the handle 23 and crimping the fastener part in place. The other part of the separable snap fastener, namely, the male part 25, is mounted upon the loop 15 of the strap 11, and this loop 15 is so arranged that the male fastener part 25 lies in cooperative relation with the female fastener part 24 when the fastener is in closed position or in closing position.

The mounting of one part 25 of the separable snap fastener upon loop 15 compensates for and accommodates the adjustment of strap 11 for length, without displacing the fastener part 25 with respect to the other fastener part 24, which displacement would ordinarily take place if the fastener part 25 were mounted directly upon the belt 11. Thus, a very simple and effective fastening means for the quick-release buckle is provided, and one which does not interfere with the adjustment of the belt as a whole to fit passengers of different sizes. Although other fastening means and arrangements for holding down the tongue 20 of the quick-release buckle lie within the scope of the invention, and other arrangements for mounting these equivalent fastening means upon the belt may be employed, the arrangement described is preferred.

In passenger aircraft, it is desirable to provide the equipment with which the passenger is associated with an attractive appearance, especially where parts of utility such as the passenger's safety belt are formed of normally unattractive material such as woven webbing, which because of its strength, uniformity, and durability, has many advantages over leather or other flexible belt materials. In order not to impair the mechanical advantages of webbing by the insertion of decorative materials, the application of decorative material has been devised in the arrangement of this invention. This decorative arrangement consists preferably of an applique of thin, decorative stripping 26, shown in Fig. 5, this applique consisting preferably of woven silk with designs of some kind, and contributing nothing to the strength nor deteriorating the mechanical advantages of the webbing in any way, but serving merely as a decorative medium for that portion of the belt which passes over the passenger's body, for example; that is, the outer surface of the belt from the anchorages 16 to the quick-release buckle, or merely from the quick-release buckle to a foot or more beyond this buckle.

It will be seen that the new safety belt for aeroplane passengers of this invention provides many advantages over those heretofore employed, in that it is really a safety belt which cannot become ineffective except when positively rendered so by an act of the passenger or another person. The danger of unauthorized or accidental release of the safety belt is prevented by this invention, and consequent injury to the passenger is also prevented. Since passengers equipped with these belts tend to rely upon them, they are subject to injury during sudden movements of the craft by being thrown out of their seats or against some object, or the like, if the belt has been inadvertently released because of the lack of the safety locking arrangement of this invention.

While a preferred embodiment of the invention has been illustrated and described herein, it is to be understood that the invention is not limited thereto, but is susceptible of many changes in form and detail within its scope.

We claim:

In a safety belt, the combination of a two part flexible web, a ring attached to one web part, a cam-shaped tongue attached to the other web part and adapted to be releasably inserted in the ring and closed to join the web parts, a member on said one web part adjacent the ring and slidable along said one web part, an element of a separable fastener mounted on said member, and the other element of a separable fastener mounted on the tongue for cooperation with the first element to hold the tongue in closed position.

In testimony whereof we affix our signatures.

RAYMOND E. DOWD.
FRANKLIN ACKER THOMPSON.